Aug. 24, 1954             K. B. GLENN             2,687,012

ROTARY PUMP AND MOTOR HYDRAULIC TRANSMISSION

Filed May 28, 1948                                       9 Sheets-Sheet 1

Fig.1.

INVENTOR
Kenneth B. Glenn
By his attorneys
Stebbins Blenko + Webb

INVENTOR
Kenneth B. Glenn

INVENTOR
Kenneth B. Glenn

Aug. 24, 1954    K. B. GLENN    2,687,012
ROTARY PUMP AND MOTOR HYDRAULIC TRANSMISSION
Filed May 28, 1948    9 Sheets-Sheet 4

INVENTOR
Kenneth B. Glenn

Aug. 24, 1954 K. B. GLENN 2,687,012
ROTARY PUMP AND MOTOR HYDRAULIC TRANSMISSION
Filed May 28, 1948 9 Sheets-Sheet 5

INVENTOR
Kenneth B. Glenn

Aug. 24, 1954   K. B. GLENN   2,687,012
ROTARY PUMP AND MOTOR HYDRAULIC TRANSMISSION
Filed May 28, 1948   9 Sheets-Sheet 6

INVENTOR
Kenneth B. Glenn

Aug. 24, 1954  K. B. GLENN  2,687,012
ROTARY PUMP AND MOTOR HYDRAULIC TRANSMISSION
Filed May 28, 1948  9 Sheets-Sheet 9

INVENTOR
Kenneth B. Glenn

Patented Aug. 24, 1954

2,687,012

UNITED STATES PATENT OFFICE 2,687,012

ROTARY PUMP AND MOTOR HYDRAULIC TRANSMISSION

Kenneth B. Glenn, New Brighton, Pa., assignor to The Glenn Hydraulic Manufacturing Company, New Brighton, Pa., a corporation of Pennsylvania Application May 28, 1948, Serial No. 29,736

23 Claims. (Cl. 60—53)

This invention relates to a hydraulic transmission such as may be interposed between a prime mover or other source of power and a driven element whereby the power applied may be so adjusted as to compensate for variations in the load. The transmission may be employed in various power operated mechanisms, as, for example, automotive vehicles, industrial machines, etc.

In my copending application Serial No. 725,570, now Patent No. 2,606,422, issued August 12, 1952, there is disclosed a hydraulic transmission which is especially well adapted for use in industrial machines such as those driven by a constant speed driving means such as a constant speed electric motor and in which a machine speed varying from a speed less than the speed of the driving means to a speed greater than the speed of the driving means is desired in operation. The transmission of my said application provides for an infinite number of ratios between the speed of the driving means and the speed of the machine being driven and has provision for maintaining continuously for any desired period any such ratio.

While the transmission of my said application is usable in automotive vehicles I have devised an improved transmission which is better adapted for such use and is automatic in its operation. While the transmission of my present application is broadly applicable it is especially well adapted for use in automotive vehicles and for purposes of explanation and illustration I shall describe the invention as embodied in an automobile transmission.

Operation of an automotive vehicle requires a high starting torque to overcome inertia at the instant motion begins, but as speed increases the torque requirements are less and the attainment of high speed with high efficiency is desired. A clutch and change gear transmission are commonly employed between the motor and the driven shaft of automotive vehicles.

It is desirable for economy that the power applied vary with the load, i. e., that the power be subject to infinite variations within given limits to compensate for load variation. A transmission should be completely flexible in its adaptation for all power and speed requirements. The unchangeable ratio of a high torque gear is as wasteful and delimits performance inversely to the same extent as the unchangeable ratio of a high speed gear. Intermediate gear change is at best an inefficient compromise.

I provide a hydraulic transmission in which the power applied varies continuously with the load, providing complete flexibility between low speed high torque operation and high speed high efficiency operation both forward and reverse. I provide a hydraulic transmission which comprises a driving rotor, a driven rotor and control means interposed between the rotors insuring variation of the ratio between the speed of the driving rotor and the speed of the driven rotor in proportion to the torque requirements. As the transmission begins operation the driving rotor rotates while the driven rotor remains stationary. As the speed of the driving rotor increases the driven rotor begins to rotate. While the torque requirements are relatively high the ratio of the speed of the driving rotor to the speed of the driven rotor is likewise relatively high. As the torque requirements become less the ratio becomes less. The speed of the driven rotor becomes more and more equal to the speed of the driving rotor until the two rotate together at the same speed.

The control is effected by means responsive to the speed of the driving rotor. Control means is provided between the driving rotor and the driven rotor which controls the quantity of hydraulic fluid impelled by the driving rotor, this being accomplished by controlling the effective area of the impelling means or blades of the driving rotor. As the driving rotor speeds up more and more hydraulic fluid is impelled from the driving rotor to the driven rotor. Initially the control means does not rotate with either rotor. However, when the speed of rotation of the driving rotor equals the speed of rotation of the driven rotor, i. e., when the torque input to the transmission equals the torque output, the control means rotates with the two rotors, thus transforming the transmission temporarily into a direct drive.

The control means may be made so that it is movable axially between the two rotors. Preferably the two rotors always remain in fixed relative axial position so that the distance between them is constant. Each of the rotors preferably has advanceable and retractable impelling means or blades and the control means limits the extent of advance of the blades of both rotors. Thus when the control means is disposed relatively near the driving rotor the blades of the driving rotor do not advance as far as when the control means is disposed farther away from the driving rotor. Likewise when the control means is disposed relatively near the driven rotor the blades of the driven rotor do not advance as far as when the control means is disposed farther away from the driven rotor. As the control means moves axially away from the driving rotor and toward the driven rotor the effective area of the blades of the driving rotor increases and the effective area of the blades of the driven rotor decreases.

As above suggested, the control means desirably moves axially as the speed of the driving rotor increases. The direction of such axial movement of the control means is away from the driving rotor and toward the driven rotor. Such axial movement of the control means may be effected by centrifugal means responsive to the speed of rotation of the control means. Preferably, as has been mentioned, the control means does not rotate when the transmission is in ratio operation, i. e., when the driving rotor is rotating substantially faster than the driven rotor. I preferably provide holding means for holding the control means against rotation until the speed of rotation of the driven rotor becomes approximately equal to the speed of rotation of the driving rotor, at which time the holding means may be rendered inoperative to permit the control means to rotate with the two rotors, the transmission then being in direct drive.

I may provide a multiple disc clutch for initially maintaining the control means against rotation and centrifugally operable means connected with the driving rotor for moving the control means axially toward the driven rotor when the transmission is in ratio operation. The clutch may be fluid pressure actuated to operative position until the speeds of the two rotors equalize, at which time the fluid pressure may be relieved. This may be accomplished by employing, for example, fluid from the driving rotor of the transmission. The clutch may also be in the form of a band brake and piston and cylinder means may be provided for contracting the band. The band may be maintained contracted by oil pressure and as the control means moves axially the flow of oil under pressure to the piston and cylinder means may be interrupted, releasing the band.

I provide reversing valve means for reversing the direction of flow of the hydraulic fluid as it moves from the driving rotor to the driven rotor so that with such valve means in one position the driven rotor is rotated in one direction and with such valve means in another position the driven rotor is rotated in the opposite direction. I preferably provide valve operating means free of the control means and movable relatively to the control means. The valve operating means are preferably operable by a manual control device disposed outside the transmission housing so that at the will of the operator the direction of drive may be reversed.

I also provide means for maintaining the control means against axial movement. The control means are preferably urged toward the driving rotor either by springs or by making the diameter of the chamber of the driven rotor slightly greater than the diameter of the chamber of the driving rotor, or both. Thus unless the control means is positively moved way from the driving rotor it will remain in its position closest to the driving rotor and will prevent projection of the blades of the driving rotor so as to have any substantial effective area. The control means may be moved axially away from the driving rotor by flyweights pivoted to the driving rotor. To maintain the control means against operation the flyweights may be locked in their inward position so that they do not fly out when the driving rotor rotates. This may be effected by a manual control operable from without the transmission housing.

In order to take advantage of the braking effect of compression or of the weight of the prime mover, I have also provided for dynamic braking means within the transmission of my invention. This is accomplished by valve means incorporated within the control means whereby the driven rotor may temporarily become the driving rotor, pumping hydraulic fluid into the driving rotor, when the speed of the vehicle becomes such that the driven rotor operates to pump a greater quantity of hydraulic fluid than is delivered to it by the driving rotor. This dynamic braking takes place automatically upon occurrence of above stated condition.

My transmission comprises other novel features including a cam for controlling the rotor blades which is movable axially of the transmission, an improved mounting for the blades themselves, an improved exhaust valve construction for exhausting hydraulic fluid from the driven rotor, including means for operating the same, and other features.

Other details, objects and advantages of the invention will become apparent as the following description of a present preferred embodiment thereof proceeds.

In the accompanying drawings I have shown a present preferred embodiment of the invention, in which.

Figure 6:
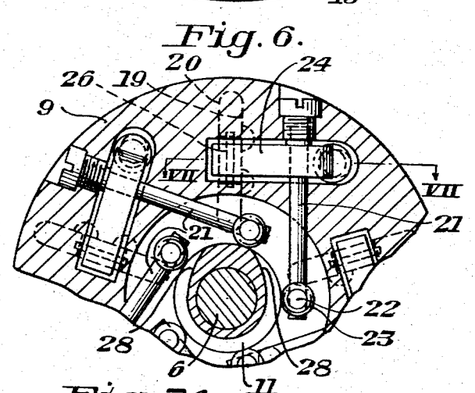
Figure 6 is a partial transverse cross-sectional view taken on the line VI—VI of Figure 1.
Figure 7:
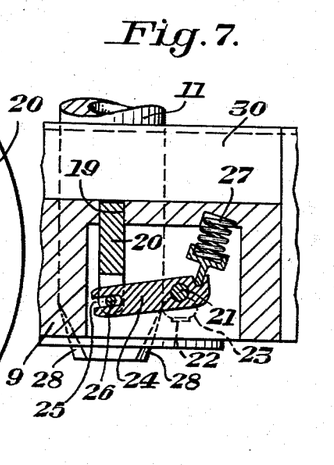
Figure 7 is a fragmentary cross-sectional view taken on the line VII—VII of Figure 6.
Figures 8, 9:
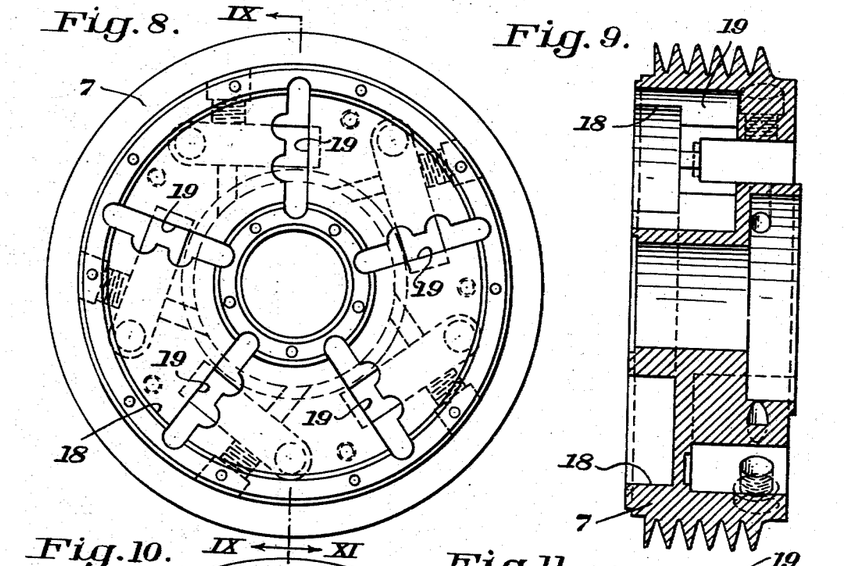
Figure 8 is a face view of the driving rotor as viewed from the right in Figure 1.
Figure 9 is an axial cross-sectional view of the driving rotor taken on the line IX—IX of Figure 8.
Figures 10, 11:
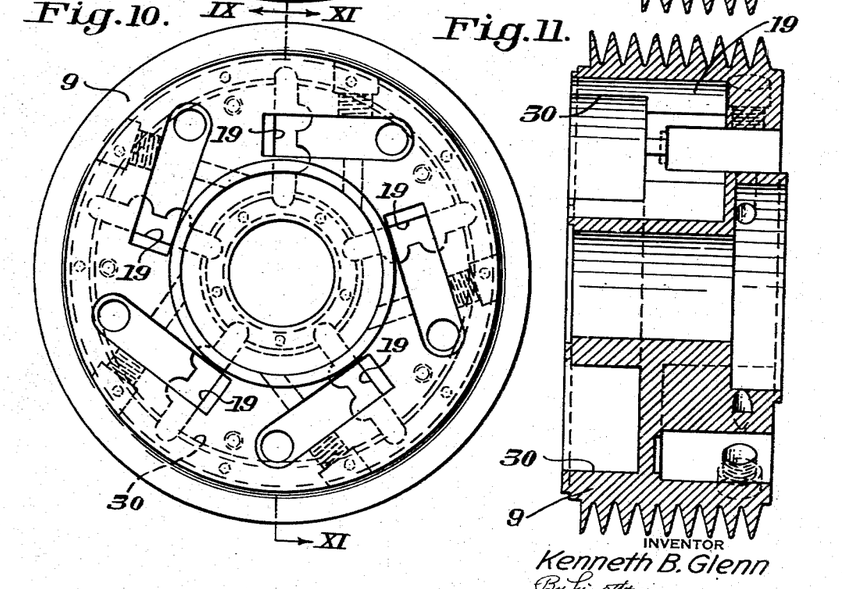
Figure 10 is a face view of the driven rotor as viewed from the right in Figure 1.
Figure 11 is an axial cross-sectional view of the driven rotor taken on the line XI—XI of Figure 10.
Figure 34:
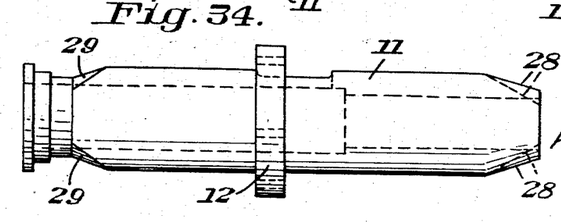
Figure 34 is a side elevation of the camshaft.
Figure 35:
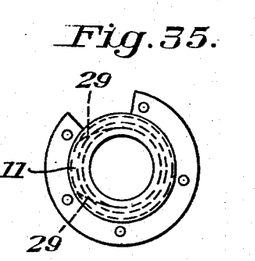
Figure 35 is an end view taken from the left in Figure 34.
Figure 36:
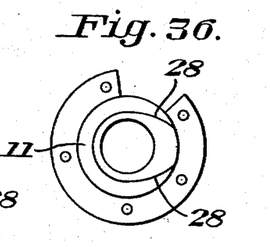
Figure 36 is an end view taken from the right in Figure 34.
Figure 40:
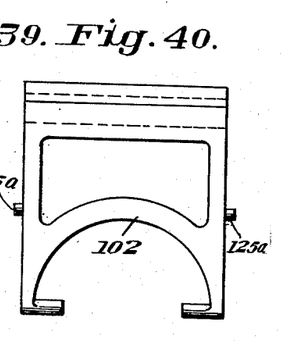
Figure 40 is a face view of the cam control yoke.
Figure 41:
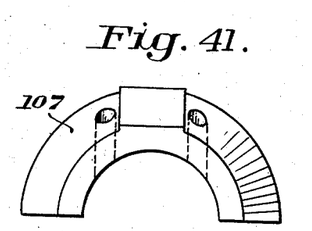
Figure 41 is a face view of a centrifugal control cam.
Figure 42:
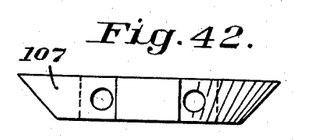
Figure 42 is a bottom view of a centrifugal control cam.

The transmission shown in the drawings comprises a housing 2 of generally cylindrical shape having adjacent its respective ends coaxial bearings 3 and 4 respectively. A driving shaft 5 is journaled in the bearing 3 and projects out of the housing toward the left viewing Figure 1. A driven shaft 6 is journaled in the bearing 4 and projects out of the housing toward the right viewing the same figure. Mounted on the driving shaft 5 are a rotor 7, a control member 8 and a driven rotor 9. The driving shaft 5 has a bell housing 10 firmly attached thereto to which the driving rotor 7 is connected by cap screws not shown. Thus the driving rotor 7 is fastened both axially and rotatably to the driving shaft 5. Surrounding the driving shaft 5 at its central portion is a cam member 11 having a radial flange 12 which is connected to the control member 8 by screws 13. Thus the cam member 11 and the control member 8 are in effect unitary. They are mounted on the driving shaft 5 so as to be rotatable with respect to that shaft; i. e., so that the shaft 5 may turn within the cam member 11 while the control member 8 and the cam member 11 are held stationary. However, at times, as will be later explained, the control member 8 and the cam member 11 rotate with the driving shaft 5. The driven rotor 9 is mounted about the cam member 11 so as to be rotatable relative thereto and to the driving shaft 5. A cap 14 is fastened to the driven rotor 9 and the driven rotor and the cap are held in working position by a thrust bearing 15, a nut 16 and cotter pin 17 on the driving shaft 5. The driving rotor 7 has an annular recess 18 defining a chamber for hydraulic fluid and a series of recesses 19 each communicating with the annular recess 18 and extending therefrom in a direction parallel to the axis of the rotor. There is provided a series of impelling means or blades 20, one of which is seated in each of the recesses 19. Mounted in the driving rotor 7 are a series of turnable pins or shafts 21 each of which extends generally tangentially of the left-hand end of the cam member 11 viewing Figure 1 and as shown in Figure 6. The inner end of each shaft 21 is disposed adjacent the left-hand end of a cam member 11 viewing Figure 1 and has a laterally projecting hub 22 on which is journaled a cam following roller 23 adapted for continuous engagement with the cam member 11. Fixed to each shaft 21 is a lever 24, one end of which is provided with a slot 25 in which is positioned a pin 26 carried by one of the blades 20. The opposite end of each lever is biased under compression coil spring 27 to urge the corresponding blade 20 outwardly of the recess 19 in which it is disposed or toward the right viewing Figure 1. Each end of the cam member 11 is eccentrically tapered as shown at 28 and 29 in Figures 34, 35 and 36 so as to maintain the blades in working position during 180° of their cycle. The cam member 11 is movable axially of the driving shaft 5 as will presently appear so the cam followers 23 for the blades 20 of the driving rotor may engage either the tapered end portion of the cam member or the cylindrical portion adjacent the tapered end portion. When the cam followers engage the cylindrical portion of the cam member 11, the blades 20 are maintained in their inward or retracted position. As the cam member 11 moves to the right viewing Figure 1 the followers 23 move down the inclined portion 29 of the cam member 11 and when each follower is on that inclined portion, shaft 21 which carries it is permitted to turn in a clockwise direction, viewing Figure 7, about the axis of the shaft to project the corresponding blade. Since the end of the cam member 11 is eccentrically tapered when the followers 23 are opposite the tapered end of the cam member, the blades will be cyclically advanced and retracted, each blade partaking of the cycle of advance and retraction for each revolution of the driving shaft 5. It is to be borne in mind that at such time the driving shaft and the driving rotor 7 turn while the cam member 11 does not turn. Under other conditions, as will be later explained, the cam member 11 turns with the driving shaft and the driving rotor, at which time the blades remain axially stationary. The driven rotor 9 is like the driving rotor 7 but is reversed in position. The driven rotor 9 has an annular recess 30 which faces the annular recess 18 of the driving rotor 7. The driven rotor 9 is provided with blades 31 which are like the blades 20 of the driving rotor 7 and are similarly mounted and operated. Advance and retraction of the blades 31 is controlled by the tapered right-hand extremity 28 of the cam member 11, viewing Figures 1 and 34. In the same manner as advance and retraction of the blades 20 of the driving rotor is controlled by the tapered left-hand extremity of the cam member, the tapered ends of the cam member 11 are so disposed relatively to each other that when the rotors are rotating relative to the cam member, each increment of advance of a blade of one rotor is balanced by an equal increment of retraction of an opposed blade of the other rotor. As indicated above, the blades 31 may have somewhat greater area than the blades 20 to insure movement of the control member to the lever, viewing Figure 1, when the mechanism is brought to a stop although this same result may be accomplished by spring means incorporated in the structure shown and presently to be described. The driven shaft has an extremity 32 journaled in the bearing 4 and adjacent portions 33 of increased diameter and a sleeve portion 34 extending toward the rotor 9 or toward the left, viewing Figure 1. The sleeve portion 34 of the driven shaft 6 is connected with the driven rotor 9 by cap screws not shown so that the driven shaft 6 is in effect integral with the driven rotor 9. The cap screws are the same cap screws which fasten the cap 14 to the rotor 9. Mounted in the portion 32 of the driven shaft 6 is a bearing 35 receiving the right-hand extremity, viewing Figure 1, of the driving shaft 5, such shaft extremity being journaled in the bearing 35. Thus the driven shaft 6 assists in positioning and journaling the driven shaft 5 while relative rotation between the two shafts is provided for.

The housing 2 comprises an upper half 36 and a lower half 37 fastened together by cap screws 38. The lower half 37 of the housing is shaped at 39 to form a base for mounting of the transmission. The housing is of substantially circular internal cross-section adjacent its ends. The upper half 36 of the housing has oppositely inwardly projecting bosses 40 at the lower extremities of its side portions and the lower half 37 of the housing has opposed inwardly projecting bosses 41 at the upper extremities of its side portions. Each of the bosses 40 has a notch at 42 at its inner lower edge and each of the bosses 41 is notched at 43 at its inner upper edge, the bosses 40 and 41 extending for only a short distance axially of the housing.

When the upper half 36 and the lower half 37 of the housing 2 are assembled, the notches 42 and 43 at the respective sides of the interior of the housing cooperate to form opposed straight parallel inwardly open guide slots 44 respectively receiving rollers 45 carried by stub shafts 46, whose function will be presently described.

The control member 8 to which is bolted the cam member 11, as above described, controls the operation of the hydraulic transmission. The axial position of the control member determines the areas of the respective blades 20 and 31 which project into the respective annular recesses 18 and 30. The control member also contains passages or ducts for hydraulic fluid and the valves for controlling the flow of hydraulic fluid as will presently be described. Each of the faces of the control member 8 cooperating with one of the rotors 7 and 9 has an annular axial projection entering the annular recess of the corresponding rotor to form an annular fluid confining channel. The control member has an annular axial projection 47 entering the recess 18 of the rotor 7 and an annular axial projection 48 entering the recess 30 of the rotor 9. Each of the rotors has an outer sealing ring 49 and an inner sealing ring 50 to prevent the escape of hydraulic fluid along the sides of the annular axial projections of the control member, the inner sealing ring 50 also sealing against the cam member 11. The control member 8 has a passage 51 extending therethrough parallel to the axis of the transmission. The passage 51 is relatively narrower at its radial face nearer the axis of the transmission and relatively wide at its radial face remote from the axis of the transmission, each of the radial faces of the passage being defined by a surface which is part of the surface of a cylinder coaxial with the shaft 5. Chambers 51a and 51b are provided at either end of the passage. Positioned in the passage 51 is a valve assembly 52. The valve assembly 52 comprises a valve block 53 in two parts 54 and 55, a cover 56 and a valve proper 57. The bottom of the valve block 53 and the top of the cover 56 are curved to conform to the curvature of the radial faces of the passage 51. The top of the valve block 53 has longitudinal corner notches 58 and the bottom of the cover 56 has projections 59 entering the notches 58 whereby the cover is accurately positioned with respect to the valve block. Similarly the two parts of the valve block proper are positioned by corner notches 60 and projections 61 in the lower and upper parts respectively. The cover and the two parts of the valve block are held in place by screws 62. The length of the valve assembly 52 in the axial direction is substantially equal to the axial distance between the bottom of the annular recess 18 in the rotor 7 and the bottom of the annular recess 30 in the rotor 9 so that the valve assembly is maintained in a fixed axial position by the rotors 7 and 9 at all times. The valve assembly is positioned by the control member 8 which is itself axially movable so that when the control member 8 moves axially the passage 51 therein which carries the valve assembly 52 slides relative to the valve assembly. When the control member rotates, the valve assembly rotates with it but does not partake of axial movement. The valve block 53 is provided with a generally conical socket 63 in which the valve 57 seats, the valve being of generally conical shape and being adapted to turn about its axis which intersects at right angles the axis of the shaft 5. The valve 57 has integral therewith or fixed thereto a stem 64 which projects downwardly therefrom parallel to the axis of the valve. This valve stem 64 projects downwardly through a slot 65 in the cam member 11 into a control ring 66. The valve is turned in its socket 63 between operative positions by means of the member 66 as will presently appear. The valve block 53 is provided with six ports 67, 68 and 69 in the upper part 55 and 70, 71 and 72 in the lower part 54. Each of these ports radiates outwardly from the valve socket 63 as shown in Figures 19 through 23. The port 67 enters the upper section of the valve block at its upper face near the left-hand end, viewing Figure 19 and extends downwardly and toward the right viewing that figure so as to intersect the socket 63. The port 69 is in effect a continuation of the port 67 intersecting the socket 63 and the lower wall of the block near the right-hand end thereof, viewing Figure 19. The port 68 is complementary to the port 69, intersecting the socket 63 at the upper right portion thereof, viewing Figure 19, and extending upwardly and to the right, intersecting the upper wall of the block adjacent the right-hand end thereof. Each of the ports 67, 68 and 69 also intersects the upper surface of the valve block 55 and extends downwardly in the block so as to have its bottom spaced only a short distance from the bottom of the valve block section 55. The port 70 enters the lower section of the valve block at its upper surface, viewing Figure 20, and extends downwardly and towards the left, viewing that figure. The port 72 is in effect a continuation of port 70, intersecting the socket 63 and the lower left surface of the block, viewing Figure 20. The port 71 is complementary to the port 70, intersecting the socket 63 and extending downwardly and to the right, intersecting the lower wall of this block near the right-hand end thereof. Each of the ports 70, 71 and 72 also intersects the upper surface of the valve block section 54 and extends downwardly in the block so as to have its bottom spaced only a short distance above the bottom of the block. The upper section 55 fits upon the upper surface of the lower section 54 in such a manner as to form a cover over the ports 70, 71 and 72 and the cover 56 fits upon the upper block in such a manner as to hold the valve in position and to cover ports 67, 68 and 69.

As will presently appear, the port 67 is an inlet port through which on operation of the transmission hydraulic fluid enters the block. Depending upon the position of the valve, whose structure will presently be described, the hydraulic fluid entering through the port 67 passes out through one of the ports 68 and 69 to the driven rotor 9 depending upon the direction in which the rotor 9 is to be rotated. The valve 57 is of a generally frusto-conical section, having two ports 73 and 74 through which hydraulic fluid passes in going from one port to another depending upon the direction in which the rotor 9 is desired to rotate.

Figures 20, 22, 23, 24, 25, 26, 27:
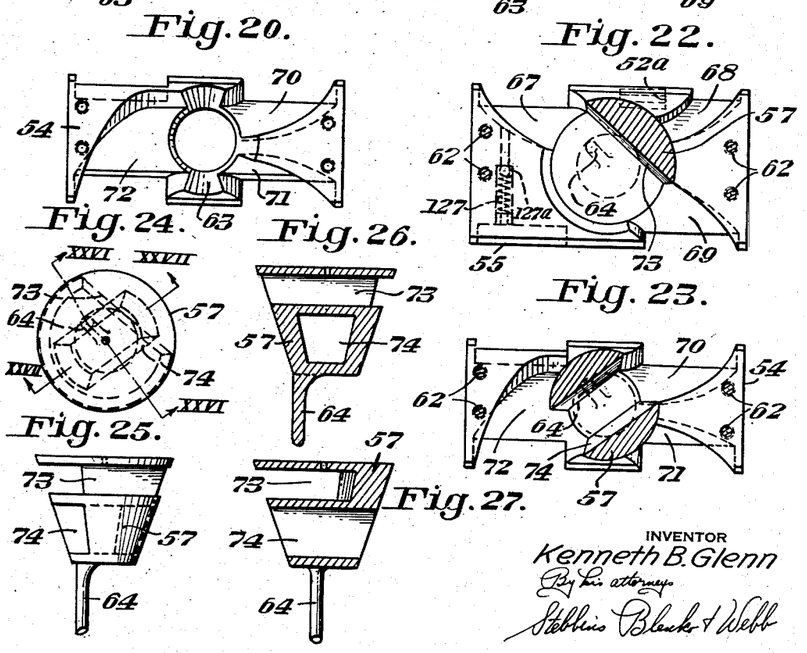
Figure 20 is a plan view of the lower section of valve casing.
Figure 22 is a cross-sectional view of the valve and valve casing taken on a line XXII—XXII of Figure 18.
Figure 23 is a cross-sectional view of the valve and valve casing taken on a line XXIII—XXIII of Figure 18.
Figure 24 is a top elevation of the reversing valve.
Figure 25 is a side elevation of the reversing valve.
Figure 26 is a cross-sectional view of the reversing valve taken on a line XXVI—XXVI of Figure 24.
Figure 27 is a cross-sectional view of the reversing valve taken on a line XXVII—XXVII of Figure 24.
Figure 21:
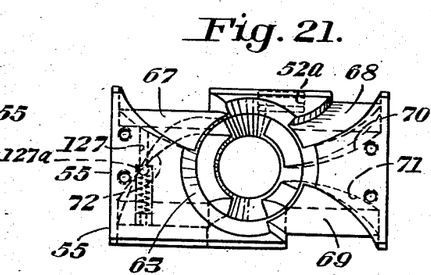
Figure 21 is a plan view of both upper and lower sections of the valve casing as assembled.
Figure 28:
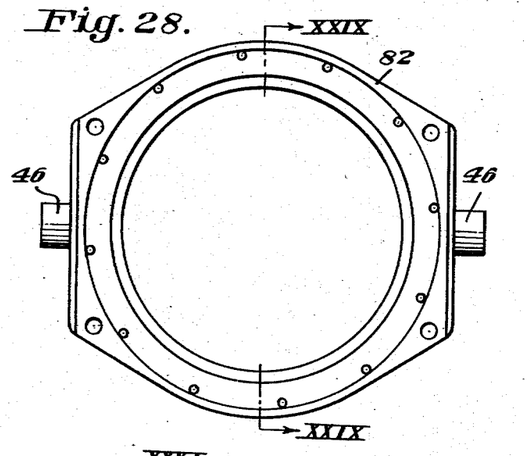
Figure 28 is a face view of the reaction ring viewed from the left in Figure 1.
Figure 29:
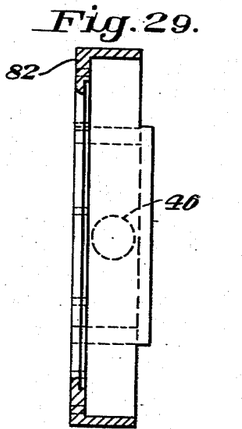
Figure 29 is an axial cross-sectional view of the reaction ring taken on the line XXIX—XXIX of Figure 28.
Figure 30:
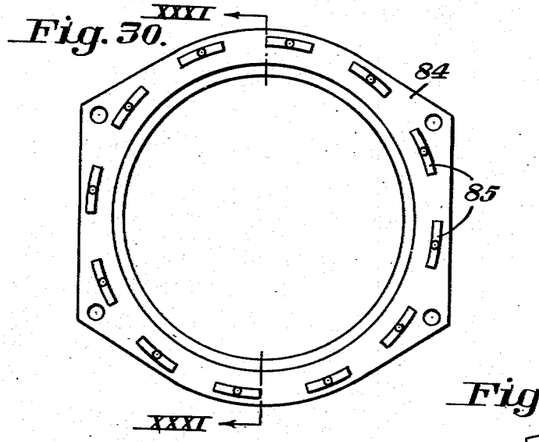
Figure 30 is a face view of the reaction ring coverplate viewed from the right in Figure 1.
Figure 31:
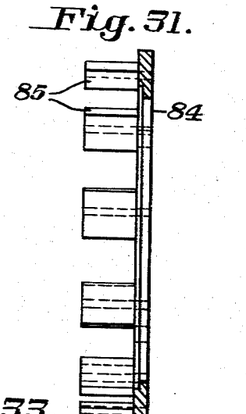
Figure 31 is an axial cross-sectional view of the coverplate taken on a line XXXI—XXXI of Figure 30.
Figure 32:
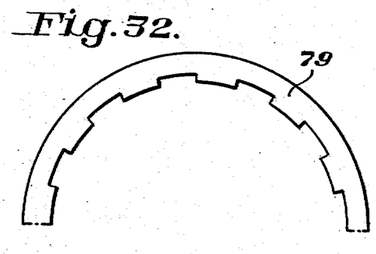
Figure 32 is a face view of center member clutch disc.
Figure 33:
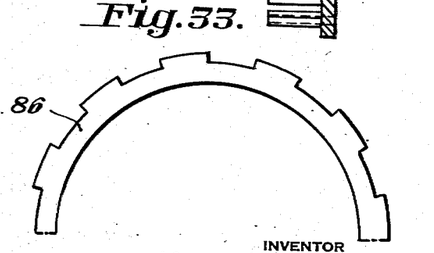
Figure 33 is a face view of reaction ring clutch disc.

When the valve is turned to a position in which the port 73 faces directly the port 69 as shown in Figure 22, the hydraulic fluid entering through the port 67 passes directly through port 73 in the valve and out of the block through port 69. When the valve is in that position, the port 68 has no function. In this position, however, port 74 faces directly port 70 and serves as a return passage for the fluid from driven rotor 9 to driving rotor 7, the lower port 71 having no function. When the valve is turned to a position such that port 73 faces directly port 68, the fluid entering port 67 passes through port 73 and port 68 into the driven rotor 9. When the valve is in that position port 69 has no function. In this position of the valve the lower port 71 faces directly port 74 and serves as a return passage for the fluid from the driven rotor through port 71, port 74 and port 72 to the driving rotor. In this position the lower port 70 has no function. When the hydraulic fluid impelled by the driving rotor 7 passes to the driven rotor 9 through the ports 67 and 69 in the upper valve block 55 it impinges on the blades 31 of the rotor 9 at one face of each thereof to drive the rotor 9 in the direction away from those faces. When the hydraulic fluid impelled by the driving rotor 7 passes to the driven rotor 9 through the ports 67 and 68 in the upper valve block 55 it impinges on the blades 31 of the rotor 9 at the opposite face of each thereof to drive the rotor 9 in the opposite direction. Thus the valve 57 acts as a reversing valve for determining the direction in which the driven rotor is rotated.

It is manually operable from outside the housing as will be described.

Figures 12, 14:
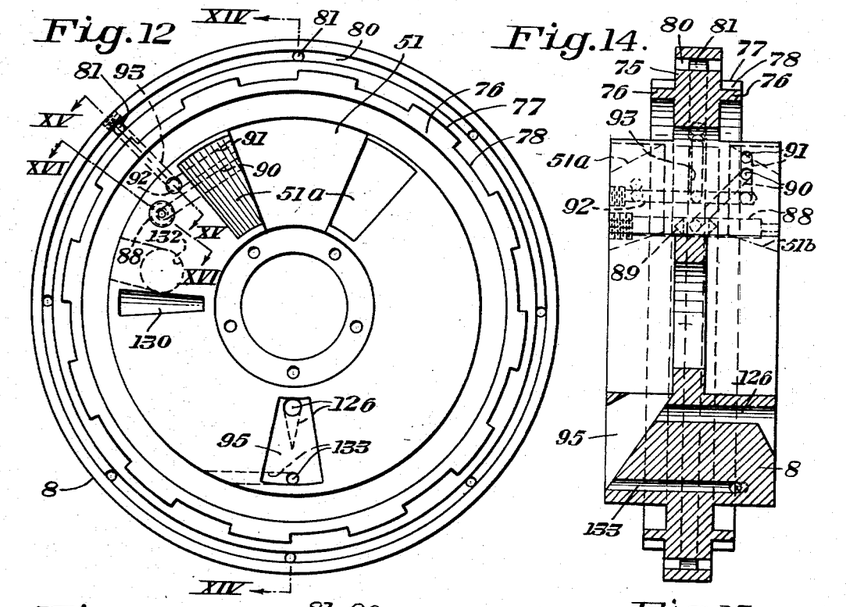
Figure 12 is a face view of the control member as viewed from the left in Figure 1.
Figure 14 is an axial cross-sectional view of the control member taken on the line XIV—XIV of Figure 12.
Figure 13:
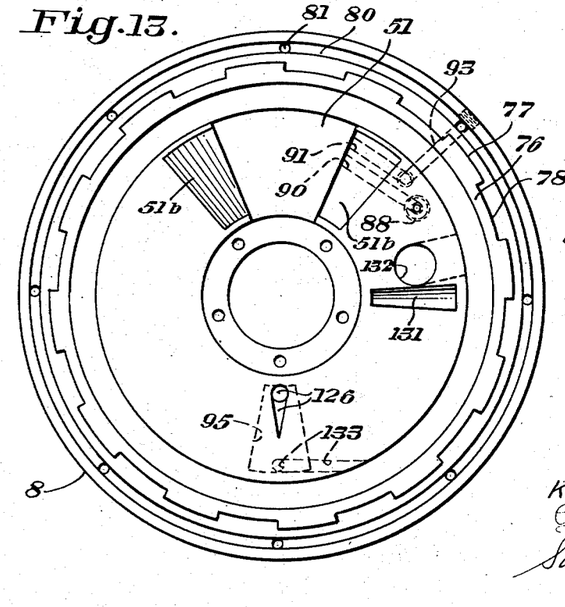
Figure 13 is a face view of the control member as viewed from the right in Figure 1.
Figure 15:
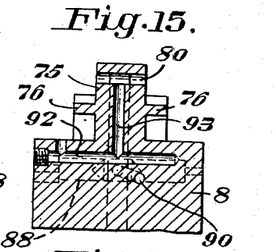
Figure 15 is a fragmentary cross-sectional view taken on the line XV—XV of Figure 12.

The control member 8 is shown in cross-section in Figure 14. It has an integral radial projection 75 disposed intermediate its ends. The projection 75 has integral annular rings 76 disposed on either side midway between the body of the control member and the outer extremity of the projection. The rings have periodically spaced ridges 77 and grooves 78 into which are fitted control member clutch discs 79. Midway between the annular rings 76 and the outer extremity of the radial projection 75 are annular grooves 80 connected by passages 81 through the radial projection 75. The purpose of these grooves and passages will later appear.

Surrounding the control member 8 and enclosing the radial projection 75 is a reaction ring 82 illustrated in Figures 28, 29, 30 and 31. The reaction ring comprises two parts, the ring proper 83 carrying rollers 45 journaled on stub shafts 46 and the coverplate 84 having projecting members 85 serving to hold the reaction ring clutch discs 86 in position on either side of the radial projection 75 of the control member 8. The reaction ring proper 83 and the coverplate are assembled about and enclose the radial projection 75, the control member clutch disc 79, and the reaction clutch disc 86. The reaction ring and coverplate are held together by cap screws 87.

A shuttle valve bore 88 is drilled in the control member 8 parallel with the axis of the control member and adjacent to and on the left side of the valve assembly bore 51, viewing Figure 12. A shuttle valve piston 89 is placed in said bore 88 so that it floats in said bore and is reversibly moved to the seat of least pressure in either rotor. The bore 88 communicates with the valve assembly bore 51 by a passage 90. A second passage 91 connects the valve bore 51 with a bore 92 parallel to and adjacent the shuttle valve bore 88. Fluid entering the shuttle valve bore 88 forces the valve piston 89 to the seat of least pressure permitting the fluid to flow through passage 90 to the valve bore 51 from whence it enters recess 52a in the side of the valve block 52 and thence passage 91 to the bore 92. A passage 93 connecting bore 92 and the annular grooves 80 carries the fluid from bore 92 to the annular grooves 80 where it forces the pressure ring 94 against the control member clutch disc 79 locking them to the reaction ring 82.

Thus the control member 8 is maintained against rotation when the front rotor starts to pump from zero by the flow of fluid through the above described channels to the clutch discs, thereby locking the control member to the reaction ring 82. When, however, the control member 8 moves to its extreme position toward the driven rotor 9, the passages 90 and 91 are no longer in register with the recess 52a, the flow fluid to the clutch plates ceases and the control member is released.

Figure 1:
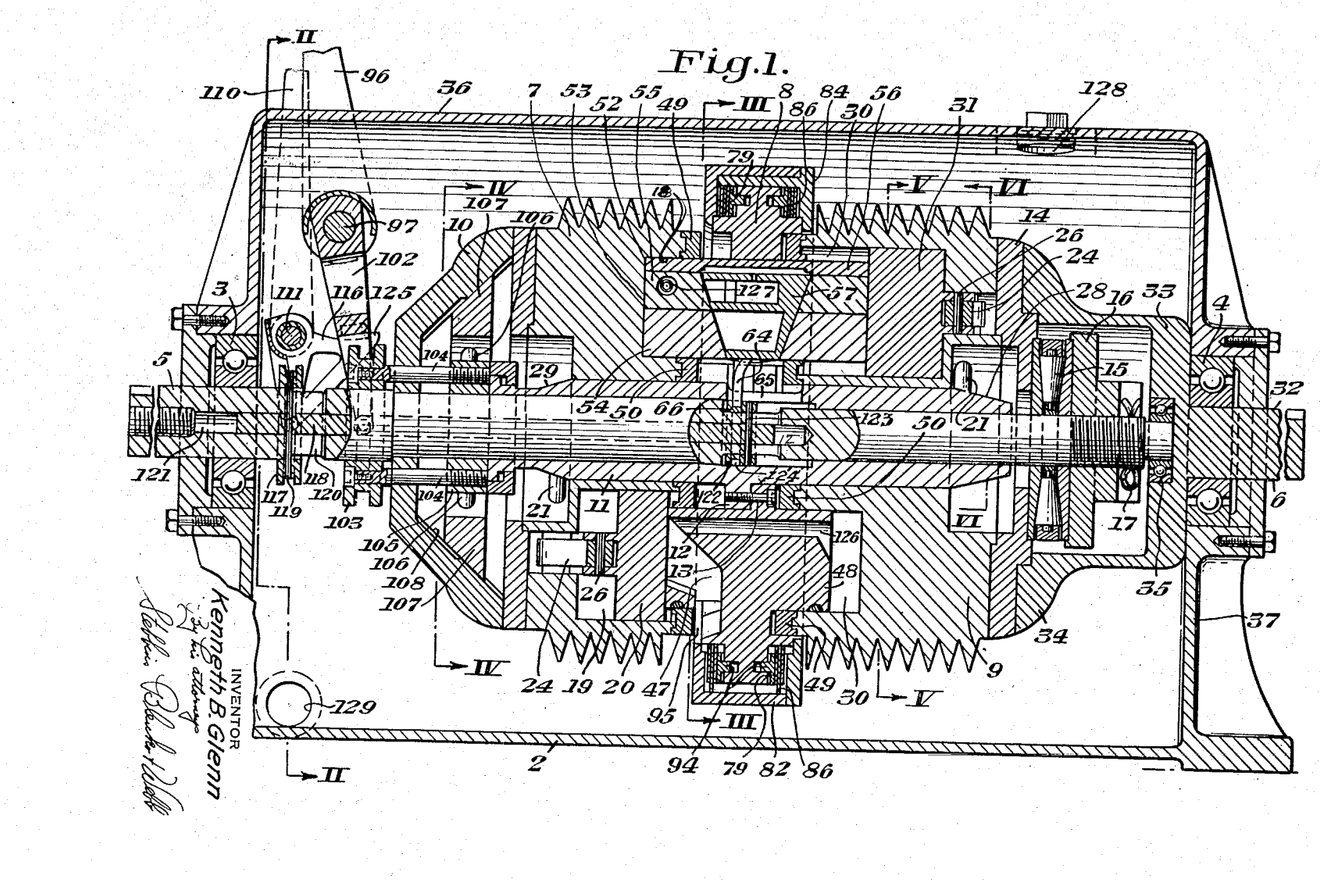
Figure 1 is a central vertical longitudinal cross-sectional view of a hydraulic transmission.
Figure 1A:
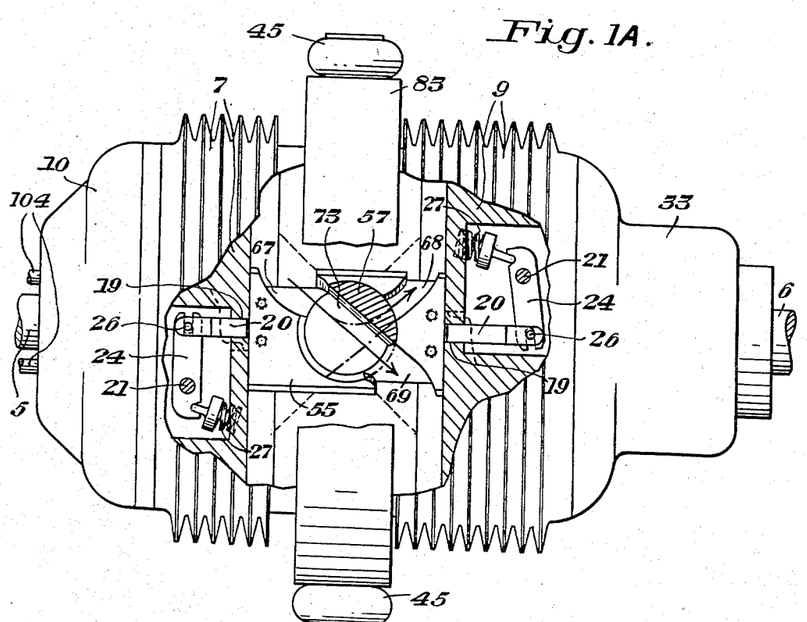
Figure 1A is a top view, partly cut away, showing the movement of fluid through the reversing valve.
Figure 1B:
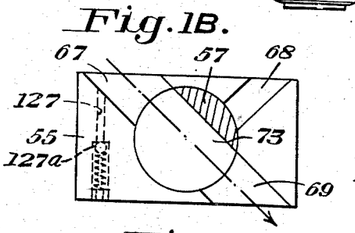
Figure 1B is a plan view of reversing valve assembly in forward position.
Figure 1C:
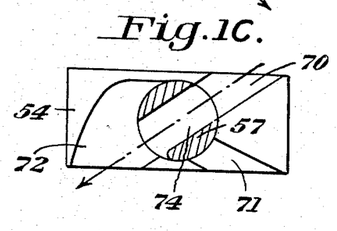
Figure 1C is a plan view of reversing valve in position of dynamic braking in forward.
Figure 1D:
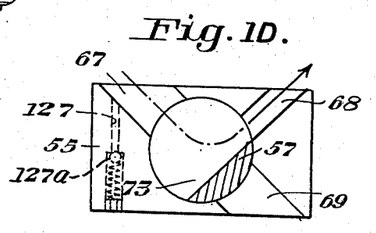
Figure 1D is a plan view of reversing valve assembly in reverse position.
Figure 1E:
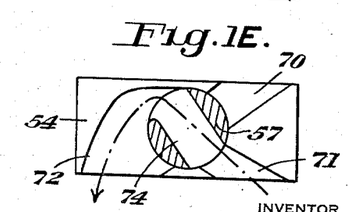
Figure 1E is a plan view of reversing valve in position of dynamic braking in reverse.
Figure 2:
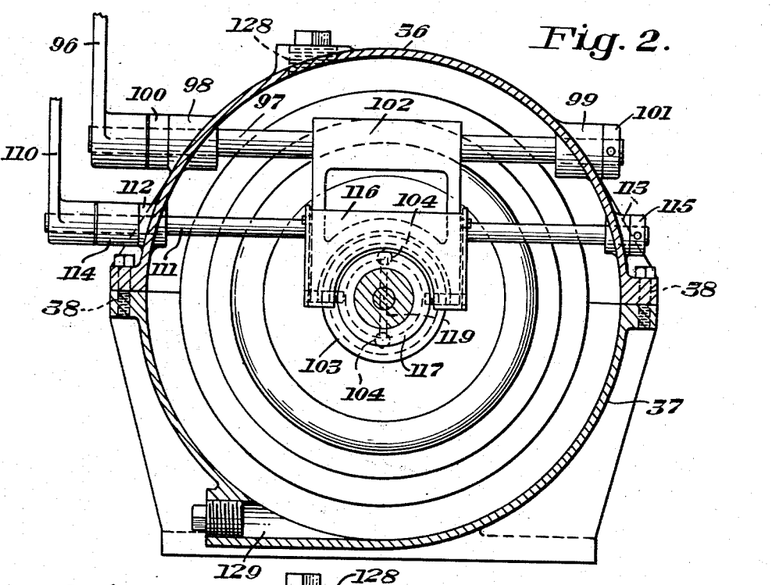
Figure 2 is a transverse cross-sectional view taken on the line II—II of Figure 1.
Figure 3:
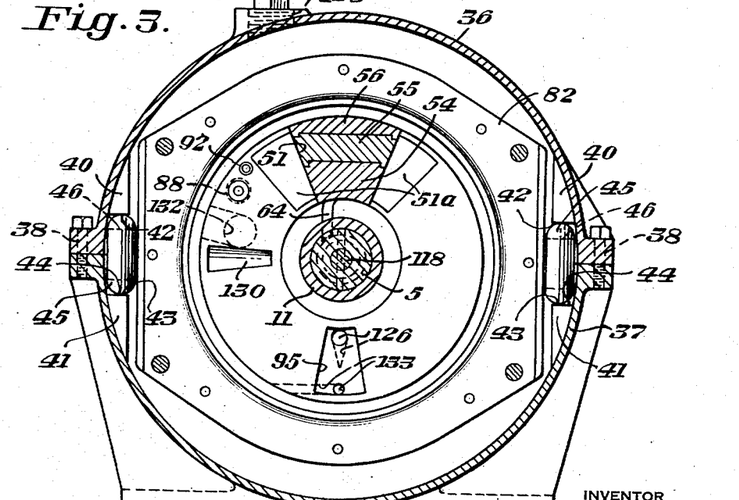
Figure 3 is a transverse cross-sectional view taken on the line III—III of Figure 1.
Figures 4, 37, 38, 39:
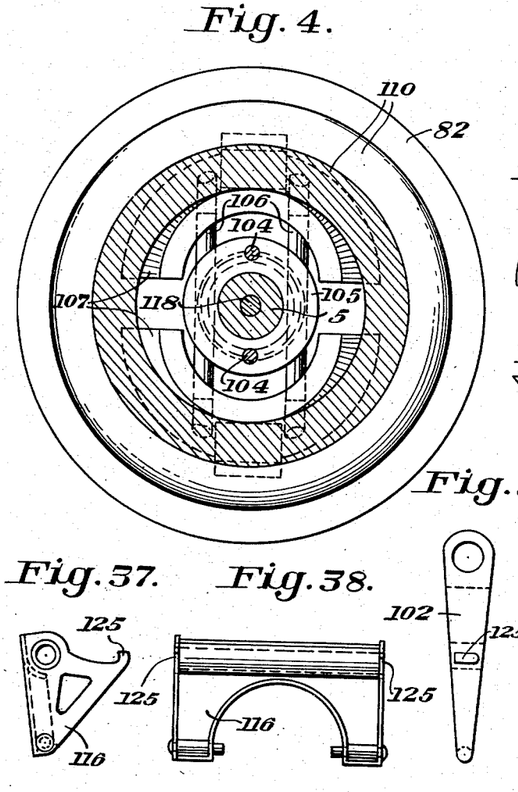
Figure 4 is a transverse cross-sectional view taken on the line IV—IV of Figure 1.
Figure 37 is an end view of the reversing yoke.
Figure 38 is a face view of the reversing yoke.
Figure 39 is an end view of the cam control yoke.
Figure 5:
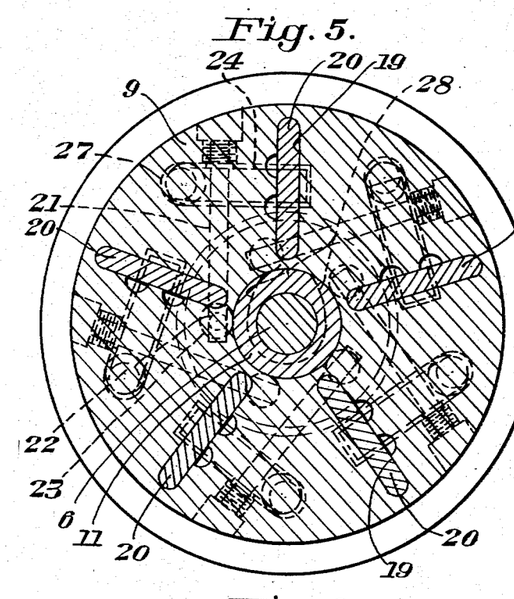
Figure 5 is a transverse cross-sectional view taken on the line V—V of Figure 1.
Figure 16:
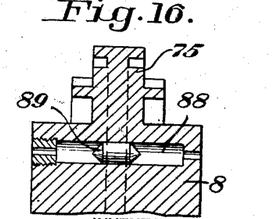
Figure 16 is a fragmentary cross-sectional view taken on the line XVI—XVI of Figure 12.
Figure 17:
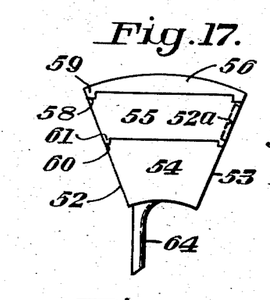
Figure 17 is an end view of the reversing valve and valve casing.
Figure 18:
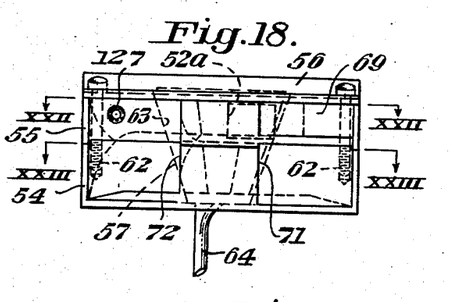
Figure 18 is a side elevation of the reversing valve and valve casing.
Figure 19:
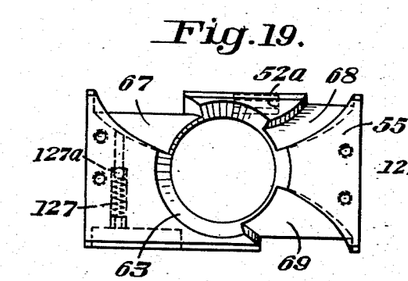
Figure 19 is a plan view of the upper section of valve casing.

When the parts are in the position shown in Figure 1, the control member 8 is approaching its extreme position toward the rear of driven rotor 9. In such a position the followers 21 for operating the blades 20 ride on the eccentric position of the cam member 11 and the blades 20 consequently are in position for pumping hydraulic fluid from the driving to the driven rotor. Hydraulic fluid entering the annular recess 18 in the left side of the control member, viewing Figure 1, by means of passage 95 is carried by the blades 20 on the driving rotor to the valve block 52. The pressure created by the fluid trapped between the blade 20 and the valve block 52 causes the shuttle piston 89 to move to the right, viewing Figure 16, in the shuttle piston bore 88. The fluid enters the bore 88, flows through the passage 90 to the valve bore 51, from thence to the bore 92 through passage 91 and passing through passage 93 forces the pressure ring 94 against the clutch discs 79 locking the control member 8 against rotation relative to the reaction ring 82. The remaining fluid is forced through ports 67 and 69 in the valve block into the annular recess 30 in the control member where it impinges upon the blades 31 in the driven rotor. The driven rotor is thereby caused to rotate in the same direction as the driving rotor.

The ratio of pumping from front to rear rotor is controlled by the movement of the control member 8 and the cam member 11 connected thereto. The control member may be either manual or automatic. Manual control of the cam member 11 and consequently the control member 8 is accomplished by the external lever 96 and the internal linkage connected thereto. Lever 96 is attached to the end of a shaft 97 journaled in bearing portions 98 and 99 of the upper casing 36 and prevented from axial movement therein by locking rings 100 and 101. A forked yoke 102 is rotatably mounted upon the shaft 97 within the housing 2 so that the two ends of the fork engage an annular groove in the shift ring 103 which is mounted upon the driving shaft. The shaft ring 103 is connected by rods 104 to a ring 105 which carries pairs of oppositely disposed lugs 106 upon which are slidably mounted flyweights 107. The ring 105 is engaged around the left-hand end of cam member 11, viewing Figure 1, so that movement of the ring causes an axial shift in the position of the cam member. The bell housing 10 surrounds the flyweights 107 and prevents them from leaving the lugs upon which they are mounted. The housing has an offset portion 108 into which the flyweights may be drawn and locked. In operation the control of the cam member is effected in the following manner. The flyweights are disengaged from the locking means 108 by shifting the manual lever to the left, viewing Figure 1. With the driving shaft rotating the flyweights by centrifugal action are forced outward against the bell housing and as the speed of rotation increases tend to assert a greater force against this housing and because of their shape and the shape of the housing move toward the right, viewing Figure 1, forcing the cam member to the right. The forked yoke 102 is free to rotate around the shaft 97 within certain limits defined by means 109 on shaft 97 which means acts upon the yoke during manual operation but permit free rotation of the yoke when in centrifugal or automatic operation.

The transmission is reversed manually. This is accomplished by means of the external lever 110 and internal linkage connected therewith. The lever 110 is attached to the end of a shaft 111 journaled in bearing portions 112 and 113 in the upper casing 36 and are prevented from axial movement therein by the locking rings 114 and 115. A forked yoke 116 is attached to the shaft 111 so that the two ends of the fork engage an annular groove in the shift ring 117 which is mounted upon the driving shaft. The yoke 116 has integral therewith a locking member 125 which cooperates with lugs 125a on the cam control yoke preventing operation except when the cam control yoke 102 is in its extreme left-hand position viewing Figure 1. In this position the yoke 116 engages the cam control yoke 102, thereby preventing damage to the transmission by accidental reversing of the transmission while the front rotor is in pumping position. The shift ring is connected to a piston 118 by means of a pin 119 operating through slots 120 in the driving shaft. The piston 118 operates within the hollow center portion 121 of the driving shaft which extends through the shaft to beyond the right-hand side of the control member, viewing Figure 1. A second shift ring 122 is connected to the opposite end of piston 118 by means of a pin 123. An annular groove 124 in the shift ring 122 engages the valve stem 64 of the reversing valve 57. By moving the lever 110 to the left, with the cam control yoke at extreme left, viewing Figure 1, the shift ring 117 is moved to the right, moving with it the piston 118 and likewise the ring 122. As the ring 122 moves to the right it turns the valve stem 64 and with it the valve 57 to a position such that fluid entering port 67 in the valve block 52 leaves the valve block through port 68 causing the driven rotor 9 to rotate in a direction opposite to that of the driving rotor 7 thereby effectively reversing the transmission.

The transmission is also adapted for dynamic braking, as for example, when the ratio of driving rotor speed to driven rotor speed reaches a predetermined value. When the speed of the driven rotor 9 is such that the pumping action of the driven rotor 7 is insufficient to fill the annular channel 30 in the driven rotor 9, the ratio is exceeded and dynamic braking begins. Under such conditions fluid from the outer housing enters through the passages 95 and 126 into the annular channel 30 in the rear rotor 9. The blades 31 carry the fluid before them into the valve block 52 through the port 70. In the valve block the fluid passes through the valve port 74 and out of the valve block through port 72 into the annular channel 18 in the driving rotor where it impinges against the blades 20 causing the driving rotor to be in effect a driven rotor. The movement of the driving rotor 7 is resisted by the weight or compression of the prime mover which is connected to the driving shaft 5.

Through the valve block 52 is a bore 127. Within the bore is a spring loaded ball valve 127a which acts as a safety valve normally closing the bore against the passage of fluid from one side of the valve block to the other. The valve is designed to relieve the pressure within the rotor 7 in the event that the pressure exceeds the pressure resisted by the spring loaded valve.

Blade release bleeders 130 and 131 are provided in the control member to release the fluid pressure from the blades before retraction.

A neutral discharge port 132 in the control member discharges fluid from the rear rotor into the reservoir whenever the front rotor is locked in neutral position with the rear rotor rotating.

A centrifugal discharge passage 133 permits the discharge into the reservoir of fluid picked up by the front rotor blades after passing the valve block.

The housing 2 acts both as a reservoir for the hydraulic fluid and as a casing for the operating mechanism of the hydraulic transmission. The housing is provided with threaded and plugged openings 128 and 129 respectively for the reception and draining out of hydraulic fluid.

The operation of the hydraulic transmission shown in the drawings and above described will now be explained. The housing 2 is filled with hydraulic fluid to a level above the control member 8. Hydraulic fluid enters the channel 95 of the control member 8 and thence into the annular channel 18 in the driving rotor 7.

Driving shaft 5 is turned by any suitable driving means, as for example, an internal combustion engine, the direction of turning being as above mentioned, clockwise looking from the left to the right of the shaft viewing Figure 1. When the engine or motor is first started the transmission is in neutral position. The flyweights 107 are locked in inoperative position by the locking portion 108. This maintains the control member 8 in its extreme left-hand position nearest to the rotor 7 viewing Figure 1. The clutch bands 79 and 86 within the reaction ring are held in the engaged position by fluid pressure created by the driven rotor 9 remaining in a static position. Thus, the control member 8 is maintained against rotation. If the driven shaft 6 is to be rotated in the same direction as the driving shaft 5 the reversing valve 57 is in position to direct the hydraulic fluid delivered by the rotor 7 through the ports 67 and 69 to the rotor 9.

After the motor has been started, then warmed up, the yoke member 102 for locking the flyweights 107 in operative position is moved towards the right viewing Figure 1 by operation of the lever 96 whereupon the flyweights 107 become operative and fly out due to centrifugal force. While the flyweights are in the inoperative position no hydraulic fluid is delivered or impelled by the blades of the driving rotor 7 since those blades are maintained in retracted position by reason of the fact that their followers 23 are riding on the circular portion of the cam member 11, removed from the end of that member. At this time the shaft 6 is not rotating. As the engine speeds up the flyweights 107 responding to centrifugal action move outwardly and by pressure against the bell housing 10 begin to move the control member 8 to the right viewing Figure 1. Thereupon the followers 23 begin to ride down on the inclined portion 29 of the cam member 11. As soon as the followers begin to ride on the inclined portion of the cam member the blades 20 begin to have effective fluid impelling area and they impel fluid to the driven rotor 9 as has been explained to rotate that rotor and hence the driven shaft 6 with which the rotor 9 is connected.

During the initial stage of operation from the start the control member 8 is maintained stationary by the reaction ring 82 and its contained clutch discs 79 and 86 by reason of fluid pressure from the static rear rotor 9. When, however, the control member has been moved by the cam member 11 to the right viewing Figure 1, the fluid pressure from the driving rotor becomes sufficient to shift the valve 89 and to permit fluid under pressure from the driving rotor to maintain the clutch engagement. When the input torque is equal to the output torque and the rotor 7 and 9 are rotating in the same direction at the same speed the pressure on the valve 89 from both the driving rotor 7 and the driven rotor 9 are equal and the valve stands in a neutral position such that fluid is not communicated to the pressure ring 94. The clutch discs 79 and 86 are thereby released from engagement with the reaction ring 82 and the control member 8 is free to rotate. In this condition the transmission becomes a direct drive with the speed ratio of the driving and driven shafts 1:1. When the speed of the driving shaft slows down relatively to that of the driven shaft the clutch discs 79 and 86 are forced into engagement by fluid pressure from the driven rotor and the control member is no longer free to rotate. At the same time fluid pressure created within the driven rotor 9 reacts to move the control member 8 toward the left viewing Figure 1 and at the same time forces fluid through the valve block and valve into the driving rotor acting to cause dynamic braking of the driven rotor. During ratio operation, as explained above the ratio varies automatically according to the torque. In other words, the torque requirements make the ratio for high torque requirements a transmission operates at high ratio and for low torque requirements a transmission operates at low ratio. There is nothing which the operator need do to control the ratio, no gears to change and no clutch to operate. The only manual controls are the lever 96 for locking the transmission in neutral position and the reversing lever 110. When the transmission is in reverse the operation is similar to that above described with the fluid from the driving rotor passing through ports 67 and 68 in the valve block rather than ports 67 and 69.

When the ratio of speed of the driving rotor 7 to the speed of the driven rotor 9 reaches a predetermined point, i. e., when the speed of the driven rotor is such that the driving rotor no longer pumps enough fluid to fill the driven rotor, the driven rotor draws fluid from the reservoir through the passages 95 and 126 in the control member 8 and pumps it through the valve 52 into the driving rotor. The driven rotor thereby becomes the pumping rotor, pumping fluid against the blades 20 of the driving rotor. The driving rotor, because of its connection with the prime mover, resists the force of the fluid impelled by the driven rotor. Thus dynamic braking of the unit is automatically accomplished, taking advantage of the weight and compression of the prime mover.

While I have shown and described a present preferred embodiment of the invention, it is to be understood that the invention is not limited thereto but may be otherwise variously embodied within the scope of the following claims.

I claim:

1. A hydraulic transmission comprising a rotor, connections through which the rotor may be rotated, impelling means carried by the rotor for impelling hydraulic fluid conducted to the rotor upon rotation of the rotor to deliver the same from the rotor, the impelling means being advanceable and retractable to alter the effectiveness thereof, control means movable relatively to the rotor generally axially thereof and forming a chamber therewith for controlling the extent of advance of the impelling means, centrifugally operable means carried by the rotor for moving the control means generally axially of the rotor, delivery means in the control means providing a passage for hydraulic fluid delivered from the rotor, rotatable means receiving the hydraulic fluid delivered through said passage and being rotated thereby, a reversing valve in the delivery means movable to at least two positions to control the flow of hydraulic fluid delivered through said passage so as to rotate the rotatable means selectively in opposite directions, a valve-operating member slidable generally along the axis of the rotor and connections between the valve-operating member and the valve whereby upon sliding the valve-operating member along the axis of the rotor the valve is moved between said positions.

2. A hydraulic transmission as claimed in claim 1 in which the rotatable means receiving the hydraulic fluid is provided with fluid-receiving blades advanceable and retractable axially to alter the effectiveness thereof, the advancement and retraction of said blades being controlled by the axially movable control means said control means forming a chamber with the rotatable means in which said blades move.

3. A hydraulic transmission comprising a rotor, connections through which the rotor may be rotated, impelling means carried by the rotor for impelling hydraulic fluid conducted to the rotor upon rotation of the rotor to deliver the same from the rotor, the impelling means being advanceable and retractable to alter the effectiveness thereof, control means movable relatively to the rotor generally axially thereof and forming a chamber therewith for controlling the extent of advance of the impelling means, a series of flyweights within the rotor, means within the rotor operable by the flyweights as they are projected outwardly from the axis of rotation due to centrifugal action to move the control means axially of the rotor, delivery means in the control means providing a passage for hydraulic fluid delivered from the rotor, rotatable means receiving the hydraulic fluid delivered through said passage and being rotated thereby, a reversing valve in the delivery means movable to at least two positions to control the flow of the hydraulic fluid delivered through said passages so as to rotate the rotatable means selectively in opposite directions, a valve-operating member slidable generally along the axis of the rotor and connections between the valve-operating member and the valve whereby upon sliding the valve-operating member along the axis of the rotor the valve is moved between said positions.

4. A hydraulic transmission as claimed in claim 3 in which the rotatable means receiving the hydraulic fluid is provided with fluid-receiving blades advanceable and retractable axially to alter the effectiveness thereof, the advancement and retraction of said blades being controlled by the axially movable control means, said control means forming a chamber with the rotatable means in which said blades move.

5. A hydraulic transmission comprising a rotor, connections through which the rotor may be rotated, impelling means carried by the rotor for impelling hydraulic fluid conducted to the rotor upon rotation of the rotor to deliver the same from the rotor, said impelling means being advanced and retractable to alter the effectiveness thereof, control means movable relatively to the rotor generally axially thereof and forming a chamber therewith for controlling the extent of the advancement of the impelling means, fluid means urging the control means in one direction, centrifugally operable means carried by the rotor for urging the control means in the opposite direction as the speed of rotation of the rotor increases, delivery means providing a passage for hydraulic fluid deliverd from the rotor, impelling means carried by the rotor for impelling into said passage hydraulic fluid conducted to the rotor upon rotation of the rotor, rotatable means receiving the hydraulic fluid delivered through said passage and being rotated thereby, a reversing valve in the delivery means movable to at least two positions to control the flow of the hydraulic fluid delivered through said passage so as to rotate the rotatable means selectively in opposite directions, a valve-operating member slidable generally along the axis of the rotor and connections between the valve-operating member and the valve whereby upon sliding the valve-operating member along the axis of the rotor the valve is moved between said positions.

6. A hydraulic transmission as claimed in claim 5 in which the rotatable means receiving the hydraulic fluid is provided with fluid-receiving blades advanceable and retractable axially to alter the effectiveness thereof, the advancement and retraction of said blades being controlled by the axially movable control means, said control means forming a chamber with the rotatable means in which said blades move.

7. A hydraulic transmission comprising a rotor, connections through which the rotor may be rotated, impelling means carried by the rotor for impelling hydraulic fluid conducted through the rotor upon rotation of the rotor to deliver the same from the rotor, the impelling means being advanceable and retractable to alter the effectiveness thereof, a cam substantially coaxial with the rotor relatively to which the rotor rotates, connections including follower means between the cam and the impelling means through which the impelling means are advanced and retracted as the rotor rotates, centrifugally operable means carried by the rotor for moving the cam means axially of the rotor to alter the extent of the advance of the impelling means, delivery means on said cam means providing a passage for hydraulic fluid delivered from the rotor, rotatable means receiving the hydraulic fluid delivered through said passage and being rotated thereby, a reversing valve in the delivery means movable to at least two positions to control the flow of the hydraulic fluid delivered through said passage so as to rotate the rotatable means selectively in opposite directions, a valve-operating member slidable generally along the axis of the rotor and connections between the valve-operating member and the valve whereby upon sliding the valve-operating member along the axis of the rotor the valve is moved between said positions.

8. A hydraulic transmission as claimed in claim 7 in which the rotatable means receiving the hydraulic fluid is provided with fluid-receiving blades advanceable and retractable to alter the effectiveness thereof, connections including follower means between the cam and the fluid-receiving blades through which the blades are advanced and retracted as fluid is delivered to the rotatable means.

9. A hydraulic transmission comprising a housing, a rotor rotatable in said housing, connections through which the rotor may be rotated, an annular channel in said rotor open at one face thereof, control means relative to which the rotor rotates cooperating with the rotor to close the mouth of said channel to form a chamber therewith, impelling means carried by the rotor adapted to project into said channel to impel hydraulic fluid conducted to the channel upon rotation of the rotor to deliver the same from the rotor, a cam substantially coaxial with the rotor relative to which the rotor rotates, connections including follower means between the cam and the impelling means through which the impelling means are advanced into and retracted from said channel as the rotor rotates, centrifugally operable means on the rotor for urging the cam means and the control means axially of the rotor to alter the extent to which the impelling means is advanced into the channel, delivery means providing a passage for hydraulic fluid delivered from the rotor, rotatable means receiving the hydraulic fluid delivered through said passage and being rotated thereby, valve means in the delivery means for controlling flow of hydraulic fluid delivered through said passage so as to rotate the rotatable means selectively in opposite directions, means slidable generally along the axis of the rotor for operating the valve means and means including an operating member projecting through the housing and operable throughout the housing for actuating the slidable means.

10. A hydraulic transmission as claimed in claim 9 in which the rotatable means is provided with an annular channel cooperating with the control means to form a chamber therewith receiving the hydraulic fluid and with fluid-receiving blades advanceable and retractable in the channel to alter the effectiveness thereof, connections including follower means between the cam and the fluid-receiving blades through which the blades are advanced and retracted as fluid is delivered to the rotatable means.

11. A hydraulic transmission as claimed in claim 9 in which the means for actuating the slidable means includes a sliding ring connected with the slidable means, a yoke engaging the sliding ring and means projecting through the housing and operable throughout the housing for moving the yoke to engage the sliding ring and hence the slidable means to operate the valve.

12. A hydraulic transmission as claimed in claim 9 in which the rotatable means receiving the hydraulic fluid is provided with an annular channel open at one face thereof and cooperating with the control means to close the mouth of said channel, fluid-receiving blades carried by the rotatable means projecting into said channel for receiving hydraulic fluid delivered to said rotatable means, follower means on said blade means contacting the cam means to advance and retract the fluid-receiving blades into and out of said channel as the rotatable means is rotated.

13. A hydraulic transmission comprising a rotor, connections through which the rotor may be rotated, an annular channel in said rotor open at one face thereof, means relative to which the rotor rotates cooperating with the rotor to close the mouth of said channel to form a pump chamber, delivery means providing passage for carrying hydraulic fluid delivered by the rotor, impelling means carried by the rotor projecting into said channel for impelling into said passage hydraulic fluid conducted to the rotor upon rotation of the rotor, a cam on said first-mentioned means substantially coaxial with the rotor, connections including follower means between the cam and the impelling means through which the impelling means are advanced into and retracted from said channel as the rotor rotates, fluid means for urging said first-mentioned means axially of the rotor in one direction to reduce the extent to which the impelling means is advanced into said channel, means controlled by the speed of the rotation of the rotor for moving the first-mentioned means axially of the rotor in the opposite direction to increase the extent to which the impelling means is advanced into said channel, a valve in said first-mentioned means controlling the direction of flow of hydraulic fluid from the impelling means, means connected to said valve for changing its position and rotatable means receiving the hydraulic fluid delivered from the delivery means and being rotated thereby.

14. A hydraulic transmission as claimed in claim 13 in which the rotatable means receiving the hydraulic fluid is provided with an annular channel open at one face thereof and cooperating with the first-mentioned means to close the mouth of said channel to form a fluid receiving chamber, fluid-receiving blades carried by the rotatable means projecting into said channel for receiving the hydraulic fluid delivered by the impelling means and driven thereby, connections including follower means between the fluid-receiving blades and the cam whereby the fluid-receiving blades are advanced into and retracted from the channel as the rotatable means rotates.

15. A hydraulic transmission comprising a rotor, connections through which the rotor may be rotated, impelling means carried by the rotor for impelling from the rotor hydraulic fluid conducted thereto upon rotation of the rotor, control means forming a chamber with the rotor for controlling the quantity of hydraulic fluid thus impelled by the impelling means disposed adjacent the rotor, holding means maintaining the control means against rotation when the rotor is rotated at relatively low speed, means for moving the control means generally axially relatively to the rotor as the speed of rotation of the rotor increases, means operable upon predetermined generally axial movement of the control means relatively to the rotor for rendering inoperative the holding means to permit the control means to rotate, delivery means providing a passage for hydraulic fluid delivered from the rotor, rotatable means receiving the hydraulic fluid delivered through said passage and being rotated thereby, valve means in the delivery means and means for actuating the valve means.

16. A hydraulic transmission as claimed in claim 15 in which the rotatable means is provided with fluid-receiving blades on the rotatable means receiving the hydraulic fluid, said blades being advanceable and retractable into the rotatable means and connections operable by movement of the control means to advance and retract the blades to alter the effectiveness thereof, said rotatable means forming with the control means a chamber in which said blades move.

17. A hydraulic transmission as claimed in claim 15 in which the means for moving the control means generally axially relative to the rotor as the speed of rotation of the rotor increases includes flyweight means carried by the rotor having connections with the control means and effective as the speed of the rotation of the rotor increases to move the control means generally axially relative to the rotor.

18. A hydraulic transmission as claimed in claim 15 in which the holding means comprises an axially movable clutch plate surrounding the control means, clutch means disposed about the control means, normally engaging the clutch plate to maintain the control means against rotation when the rotor is rotating at relatively low speed and means controlled by the speed of rotation of the rotor for releasing the clutch means from engagement with the clutch plate when the rotor is rotating at relative high speed to permit the control means to rotate.

19. A hydraulic transmission as claimed in claim 15 in which the holding means comprises a clutch plate disposed about the control means, opposed guideways extending generally parallel to the axis of the rotor, opposed rotatable members carried by the clutch plate disposed respectively in said guideways for guiding the clutch plate for movement relatively to the rotor generally axially thereof, means for moving the control means and clutch plate generally axially relatively to the rotor along the guideways as the speed of rotation of the rotor increases, expansible clutch means on the control means normally engaging the clutch plate, means for expanding the clutch means to hold the control means against rotation when the control means and clutch plate are in one generally axial position relative to the rotor, and means operable upon predetermined general axial movement of the control means and clutch plate relative to the rotor for releasing the clutch means for engagement with the clutch plate to permit the control means to rotate.

20. A hydraulic transmission comprising a rotor, connections through which the rotor may be rotated, impelling means carried by the rotor for impelling hydraulic fluid conducted to the rotor upon rotation of the rotor to deliver the same from the rotor, the impelling means being advanceable and retractable to alter the effectiveness thereof, control means movable relatively to the rotor generally axially thereof and forming a chamber therewith for controlling the extent of the advance of the impelling means, a series of centrifugally operable members mounted on the rotor and connected to the control means to move the control means axially with respect to the rotor as the speed of rotation of the rotor changes whereby the extent of the advance of the impelling means is altered so as to tend to provide for greater advance of the impelling means for faster than for slower speed of the rotor, delivery means providing a passage for hydraulic fluid delivered from the impelling means, rotatable means receiving hydraulic fluid delivered through said passage and being rotated thereby, a reversing valve in the delivery means movable to at least two positions to control the flow of hydraulic fluid delivered through said passage so as to rotate the rotatable means selectively in opposite directions, a valve-operating member slidable generally along the axis of the rotor and connections between the valve-operating member and the valve whereby upon sliding the valve-operating member upon the axis of the rotor the valve is moved between said positions.

21. A hydraulic transmission as claimed in claim 20 in which the rotatable means receiving the hydraulic fluid is provided with fluid-receiving blades advanceable and retractable axially to alter the effectiveness thereof, the advancement and retraction of said blades being controlled by the axially movable control means, said control means forming a chamber with a rotatable means in which said blades move.

22. A hydraulic transmission comprising a rotor, connections through which the rotor may be rotated, impelling means carried by the rotor for impelling from the rotor hydraulic fluid conducted thereto upon rotation of the rotor, control means disposed adjacent the rotor and forming a pump chamber therewith for controlling the quantity of hydraulic fluid thus impelled by the impelling means, centrifugally operable means carried by the rotor for urging the control means axially thereof whereby to control the extent of advance of the impelling means, a clutch disposed about the control means, opposed guideways extending generally parallel to the axis of the rotor, opposed rotatable members carried by the clutch disposed respectively in said guideways for guiding the clutch for movement relatively to the rotor generally axially thereof, said clutch being movable axially with the control means under the influence of the centrifugally operable means, a piston valve movable with the control means in its generally axial movement relative to the rotor, fluid means urging the control means in the opposite direction to that in which it moves by reason of the urging of the centrifugally operable means, a connection from the rotor to the piston valve, a connection from the piston valve to the clutch, said connection being constructed and arranged so that when the rotor is being operated at relatively slower speed the valve is opened and the clutch contracted to hold the control means against rotation and when the rotor is rotated at relatively high speed the valve is closed and the clutch is released to permit the control means to rotate, and rotatable means receiving the hydraulic fluid from the rotor and driven thereby.

23. A hydraulic transmission as claimed in claim 22 in which the rotatable means is provided with axially advanceable and retractable fluid-receiving blades and means on said blades actuated by the centrifugally operable means to control the extent of advance and retraction thereof as the speed of the rotor changes.

References Cited in the file of this patent

UNITED STATES PATENTS

| Number | Name | Date |
| --- | --- | --- |
| 932,435 | Boyden | Aug. 31, 1909 |
| 1,203,745 | Kilgore | Nov. 7, 1916 |
| 1,365,553 | Sheriff | Jan. 11, 1921 |
| 1,914,622 | Smith | June 20, 1933 |
| 2,159,941 | Guinness | May 23, 1939 |
| 2,226,481 | Rose | Dec. 24, 1940 |
| 2,384,218 | Tucker | Sept. 4, 1945 |
| 2,443,074 | Kraft | June 8, 1948 |
| 2,524,278 | Thal | Oct. 3, 1950 |